(12) United States Patent
Gass et al.

(10) Patent No.: US 11,953,423 B1
(45) Date of Patent: Apr. 9, 2024

(54) CARTRIDGES FOR LIQUID SAMPLES

(71) Applicant: Oak Analytics, Inc., Camarillo, CA (US)

(72) Inventors: James Frederick Gass, Camarillo, CA (US); Ruibo Wang, Oak Park, CA (US)

(73) Assignee: Oak Analytics, Inc., Camarillo, CA (US)

( * ) Notice: Subject to any disclaimer, the term of this patent is extended or adjusted under 35 U.S.C. 154(b) by 0 days.

(21) Appl. No.: 17/968,481

(22) Filed: Oct. 18, 2022

Related U.S. Application Data (60) Provisional application No. 63/393,418, filed on Jul. 29, 2022, provisional application No. 63/257,882, filed on Oct. 20, 2021.

(51) Int. Cl.
*G01N 21/05* (2006.01)
*G01N 21/03* (2006.01)
*G01N 21/65* (2006.01)

(52) U.S. Cl.
CPC ............. *G01N 21/05* (2013.01); *G01N 21/65* (2013.01); *G01N 2021/0389* (2013.01); *G01N 2021/052* (2013.01); *G01N 2021/054* (2013.01); *G01N 2021/651* (2013.01)

(58) Field of Classification Search
CPC ................... G01N 21/05; G01N 21/65; G01N 2021/0389; G01N 2021/052; G01N 2021/054; G01N 2021/651
See application file for complete search history.

(56) References Cited

U.S. PATENT DOCUMENTS

2014/0350363 A1* 11/2014 Freitag ............... A61B 5/14532 29/428

\* cited by examiner

*Primary Examiner* — Hina F Ayub (57) ABSTRACT

An apparatus includes a housing and a chamber. The chamber is configured to hold analyte. The chamber includes a reflective element, either a reflective coated layer or a reflective mirror, to return optical signals entering the analyte. A window is coated with an anti-reflective material or has negligible optical interference. A cap seals the chamber and the housing. A flow channel is provided within the housing and the chamber assembly to allow the analyte to flow through with reduced bubble entrapment as the cap is tightened to seal the chamber assembly.

18 Claims, 5 Drawing Sheets

CARTRIDGES FOR LIQUID SAMPLES

RELATED APPLICATIONS

This application claims priority from Provisional Patent Application No. 63/257,882, filed on Oct. 20, 2021 and Provisional Patent Application No. 63/393,418, filed on Jul. 29, 2022, which are expressly incorporated by reference herein in their entireties.

BACKGROUND

Technical Field

Embodiments of the disclosure are directed to cartridge for liquid samples. More particularly, embodiments of the disclosure are directed to cartridge for liquid samples used in Raman spectroscopy for sample analysis.

Description of the Related Art

Raman scattering of photons is a well described phenomenon, where an analyte is excited by a single wavelength light source causing a small percentage of the excitation light to be scattered and displaced in wavelength. This interaction is very weak, typically producing only 1 Raman photon per 1 million excitation photons. While measuring the Raman scattering provides highly desirable information about the chemical and physical makeup of the analyte, it is difficult to measure due to its weak response. This is especially true in substances that have a suboptimal Raman response or when the concentration of the analyte is low. Various techniques have been used to enhance the Raman efficiency of liquids especially in the area of SERS (Surface Enhanced Raman Scattering), where metallic nanoparticles are deposited either on substrate or are mixed in solution (colloid). SERS can provide enhancements in Raman output by up to $10^{15}$ times. However, SERS suffers from many challenges. While SERS can work well for qualitative measurements and detection of trace elements, it suffers from a difficulty in repeatability. This makes SERS difficult to use for quantitative measurements. SERS also faces challenges in sample preparation, requiring the sample to be dried and properly aligned to the spectrometer. In addition, the enhancement gained by SERS are dependent on several factors: size, shape, concentration of SERS nanoparticles, and "coating" type all need to be well matched to the analyte for SERS enhancement to work well. If any of these are not well matched, then the SERS enhancement will either be diminished or not work at all.

SUMMARY

Aspects of the embodiments are directed to an apparatus including a housing and a chamber. The chamber is configured to hold analyte. The chamber includes a reflective element, either a reflective coated layer or a reflective mirror, to return optical signals entering the analyte. A window is coated with an anti-reflective material or has negligible optical interference. A cap seals the chamber and the housing. A flow channel is provided within the housing and the chamber assembly to allow the analyte to flow through with reduced bubble entrapment as the cap is tightened to seal the chamber assembly.

In a first embodiment, an apparatus includes a housing, a chamber, and a window. The housing is made of a bulk material and has a first section and a second section. The first section has an input port to receive an analyte and the second section has an exit port with an overflow cavity. The chamber has a tubular shape and is encapsulated by the housing. The chamber includes an inner surface, a chamber cavity, and a mirror. The inner surface is coated by a reflective material. The chamber cavity is confined within the inner surface having a first end opening disposed in the first section and a second end opening disposed in the second section. The chamber cavity is configured to hold the analyte. The window is coated with an anti-reflective material and is configured to cap the first end opening by a first gap. The first end opening is in flow contact with the input port via a flow channel. The mirror is configured to cap the second end opening by a second gap. The second end opening is in flow contact with the overflow cavity via the flow channel. Each of the first and second gaps has a width to allow the analyte to flow through the flow channel and fill the chamber cavity.

In a second embodiment, an apparatus includes a first tube, a second tube, and a stopper. The first tube has a first inner surface surrounding a first cavity and capped with a window coated with an anti-reflective material at a first end and having an entry port at a second end. The first tube is configured to hold an analyte. The second tube has a second inner surface surrounding a second cavity and a second outer surface and inserted inside the first tube to occupy the first cavity such that the second outer surface and the first inner surface are spaced by a gap. The second inner surface is coated by a reflective material. The stopper has a mirror and is configured to be capped at the entry port to enclose the second tube. As the second tube is inserted into the first tube filled with the analyte, the analyte fills the second cavity and reaches a fill indicator on the first tube.

In a third embodiment, an apparatus includes a housing, a chamber, and a stopper. The housing has an entry port. The chamber is shaped with a curved surface and has an inner surface. An observation port is sealed with a glass window. A cavity with an opening is configured to hold an analyte. The inner surface is coated by a reflective material. The stopper has a mirror and is configured to be capped by a cap to enclose the chamber at the opening. When the stopper is capped after the chamber is filled with the analyte, the mirror is in contact with the analyte to seal the cavity.

In a fourth embodiment, an apparatus includes a body and a cap. The body has a first tubular shape, a first body end, and a second body end aligned with a center axis. The body includes a body cavity shaped according to the first tubular shape to accommodate a chamber with a second tubular shape, an entry port at the first body end, a glass window at the entry port positioned in alignment with the center axis, a shoulder disposed on the glass window and configured to retain a first chamber end of the chamber, and a cap receptacle at the second body end. The cap is configured to mate with the cap receptacle to secure a second chamber end of the chamber. The cap includes a reflection mirror mounted in a mirror carrier positioned through the center axis and configured to return an optical signal back toward the glass window, and a sealing gasket configured to seal the cap and the cap receptacle when the cap is tightened to seal the body. The chamber is configured to hold an analyte and to be inserted into the body cavity. The reflection mirror is spaced from a surface of the chamber at the second chamber end by a gap after the chamber is fully inserted into the body cavity and prior to tightening the cap. The reflection mirror is in contact with the surface as the cap is tightened to seal the body.

Further features of the disclosure will become apparent from the following description of exemplary embodiments with reference to the attached drawings.

DESCRIPTION OF THE EMBODIMENTS

A description is given of several embodiments. In each embodiment, an example is described where the disclosure is applied to an apparatus for a reflective chamber.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

Figure 1:
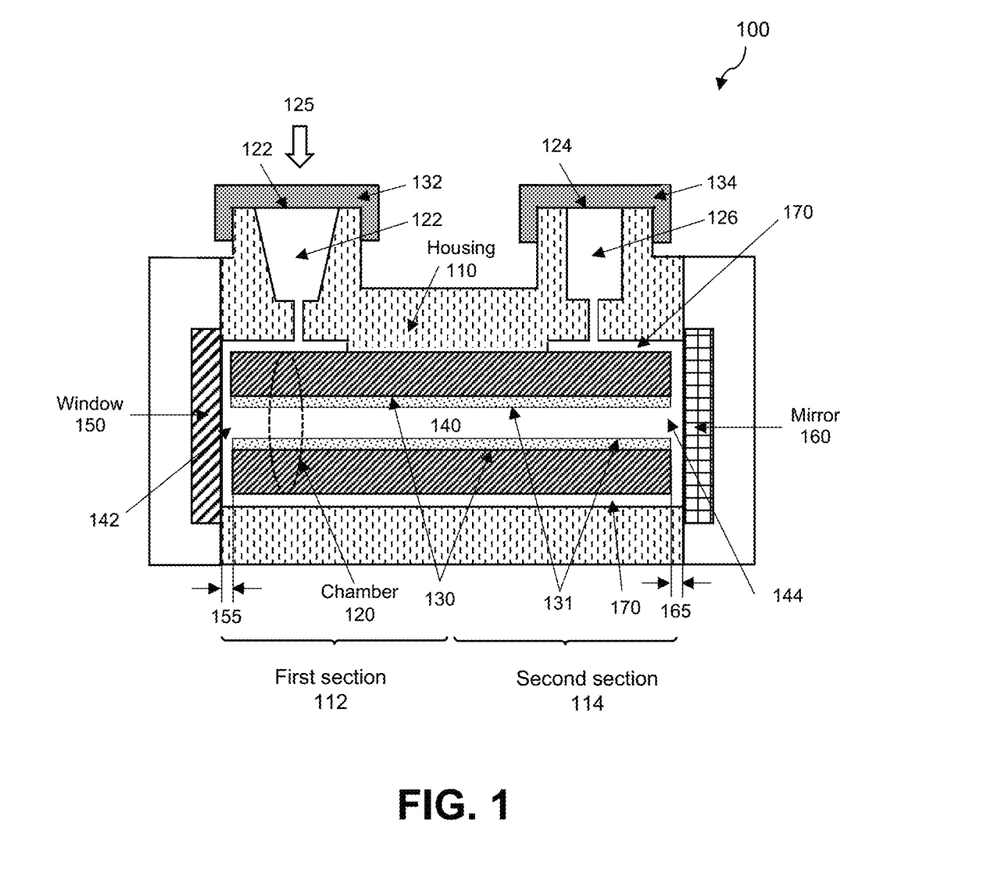
FIG. 1 is a diagram illustrating a cartridge with a hollow reflective chamber.

FIG. 1 is a diagram illustrating a first embodiment of a cartridge with a hollow reflective chamber. The first embodiment is an apparatus 100 used as a cartridge with a hollow reflective chamber to hold a liquid analyte. The analyte is analyzed using an enhancement of the Raman effect. The apparatus 100 includes a housing 110, a chamber 120, and a window 150.

The housing 110 is made of a bulk material to house or encapsulate the chamber 120. The housing 110 has a first section 112 on one end and a second section 114 on the other end. The first section 112 has an input port 122 to receive an analyte 125 that is to be transported to the chamber 120. The second section has an exit port 124 with an overflow cavity 126. In most cases, the exit port 124 and the overflow cavity 126 are the same. The input port 122 and the exit port 124 are capped by an input cap 132 and an exit cap 134, respectively. At least one of the input port 122 and the exit port 124 is sealable by a self-sealing septum or a threaded cap. The input cap 132 or the exit cap 134 may be selected from a variety of readily available, low cost, accepted industry standard devices for sealing liquid samples. They come in varying sizes to suit traditional sample vials. One possible choice is a cap sized for 2 ml sample vials. These sized caps utilize an outer diameter of approximately 9.5 mm and a pitch thread of about 1 mm and have an easy-to-use opening at around 6 mm with mating thread at 10 mm. Alternatively, the septum may be manufactured directly on the cartridge at the input port 122. In this embodiment, the input port 122 is not threaded. Instead, an uncured septum material is placed directly at the input port 122 and allowed to cure, fixing the septum to the input port 122. This method may provide a more permanent seal than the standard septum cap and also ensures the septum cap is never removed or improperly tightened. The exit cap 134 may be threaded to allow the analyte to be fully sealed for long term storage. It may be any suitable, industry standard cap. Even if long term storage is not needed, the exit cap 134 provides a simple way to ensure that dangerous analytes are not spilled or leaked.

The bulk material for the housing 110 may be made from a low-cost material such as plastic. In one embodiment, the bulk material of the housing 110 is transparent. A transparent bulk material allows the user to view the fill level of the analyte. In order for the chamber 120 to be filled with the analyte to maintain consistent results, an area between the input port 122 and the exit port 124 should make a seal between the bulk material of the housing 110 and the chamber 120. The seal ensures that the analyte flows through and fills the chamber 120 rather than flowing around it. Without a visual indication of the fill level, it may be difficult for the user to properly fill the chamber or take appropriate actions.

The length of the input port 122 or the exit port 124 may affect the quality of the measurement in terms of presence of air bubbles. At least one of the input port 122 and the exit port 124 has a depth for movement range configured to create pressure to suppress effect of air bubbles when present. The exit port 124 should have sufficient overflow capacity at the overflow cavity 126 to allow for standard syringes to be used at the input port 122 to inject the analyte into the cartridge. The overflow cavity may have a semi-transparent, rough or "frosted" surface finish due to the presence of small gaps on the surface. The semi-transparent surface finish helps to indicate when a clear analyte has filled the cavity 140 of the chamber 120. When a transparent analyte enters the overflow cavity 126, it will fill in the gaps in the surface finish of the overflow cavity 126. When these small gaps are filled in, that area of the overflow cavity 126 will appear clear instead of frosted or semi-transparent. This change will give the user a visual indication that the chamber 120 is full and the cartridge is ready to be used. The level of the analyte in the overflow cavity may serve as a fill indicator to indicate a fill level. A physical fill indicator may also be marked on the overflow cavity 126 to indicate a sufficient fill level so that the user can see how much analyte has entered into the chamber 120 and will take appropriate action.

In one embodiment, a mechanism to draw the analyte into the chamber 120 may be provided using a suction force from the exit port 124. The second section 114 may include a hollow flexible bulb (not shown) to provide a suction force to draw the analyte into the chamber. The hollow flexible bulb has a shape or size that is selected such that an appropriate amount of analyte is drawn into the chamber without drawing air. Some possible shapes include accordion, balloon, dome, and drum. If the user fails to insert enough analyte into the input port 122 and an air bubble does enter the chamber 120, the user may partially depress the bulb to remove the air, add more analyte to the input port 122, and then release the bulb to pull the analyte back in.

The chamber 120 has a tubular shape and is encapsulated by the housing 110. It includes an inner surface 130, a chamber cavity 140, and a mirror 160. The inner surface 130 is coated by a reflective material to form a coated layer 131 or a suitable material to maximize the reflectivity of the chamber. The excitation wavelength may be helpful to determine the appropriate material. Typically, the reflective material is a metal. For excitation in the visible band, a material such as silver, gold, or aluminum may be used. For excitation in the near infrared band, silver, gold, or copper have high reflectivity. In addition, it may be desirable to sacrifice some reflectivity when the analyte may react with a particular material or when longevity of the cartridge is important. In this case, gold may be a good choice as it is typically inert and does not rust. In one embodiment, glass is used in all the optical path portions of the apparatus. The chamber 120 and the mirror 160 are made with coated glass. The glass provides a smooth low thermal expansion material for the reflective coating. This keeps the measurement area stable over temperature and provides for a highly polished and reflective internal surface.

The chamber cavity 140 is confined within the inner surface 130 and has a first end opening 142 disposed in the first section 112 and a second end opening 144 disposed in the second section 114. The chamber cavity 140 is configured to hold the analyte 125 received at the input port 122. The window 150 is placed outside the chamber 120, facing the first section 112. It may be made of glass coated with an anti-reflective material and is configured to cap the first end opening 142 by a first gap 155. The first end opening 142 is in flow contact with the input port 122 via a flow channel 170. A flow contact is a contact made by a liquid to reach an opening or a conduit as it flows through. Two locations spaced apart are said to be in flow contact when they are connected by a pathway, a conduit, or a channel that a liquid can flow though from one location to the other location.

The mirror 160 is configured to cap the second end opening 144 by a second gap 165. The second end opening is in flow contact with the overflow cavity via a flow channel 170. The flow channel 170 may occupy a space surrounding an outer surface of the chamber 120 and in flow contact with the first gap 155 and the second gap 165 to provide proper flow for reducing bubble entrapment around the first end opening 142 and the second end opening 144. Each of the first and second gaps 155 and 165 has a width to allow the analyte to flow through the flow channel and fill the chamber cavity. The size of the width affects the flowability and the restriction of the light. The smaller the size, the more the light is confined and will be recycled in the chamber. On the other hand, the gap should be large enough so that the analyte can fill the chamber. Typically, a width size between 10 microns to 100 microns is a good compromise between the flow rate through the opening and the light entrapment. Instead of having a gap, a notch may be utilized to allow the liquid to flow through the cavity. The notch should be configured to allow the analyte to flow through while reducing the area for light to leave the chamber.

Figure 2:
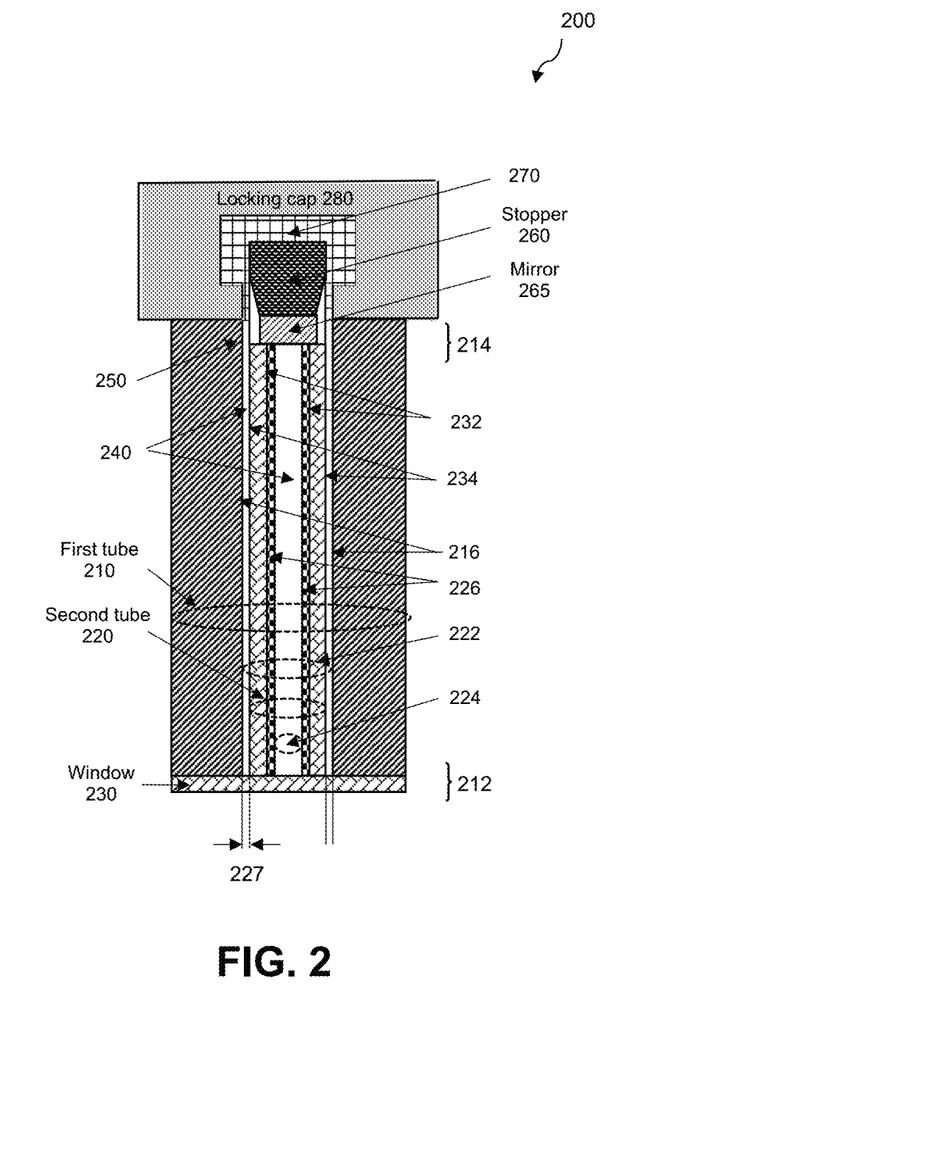
FIG. 2 is a diagram illustrating a dual tube structure to hold an analyte.

FIG. 2 is a diagram illustrating a second embodiment of a dual tube structure to hold an analyte. The second embodiment is an apparatus 200 that provides a dual tube structure to hold an analyte. The apparatus 200 includes a first tube 210, a second tube 220, and a stopper 260. At least one of the first tube 210 and the second tube 220 is made of glass.

The first tube 210 has a first end 212 and a second end 214 opposite to the first end 212. The first tube 210 has a first inner surface 216 surrounding a first cavity 222. It is capped with a window 230 coated with an anti-reflective material at the first end 212. It has an entry port 250 at the second end 214. The first tube 210 is configured to hold an analyte 240. It has a fill indicator marked on its surface to indicate a fill level of the analyte when the analyte is injected into the first cavity 222. The fill indicator is defined according to the dimensions, structure, and the configurations of all the components of the apparatus 200.

The second tube 220 has a second inner surface 232 surrounding a second cavity 224 and a second outer surface 234. It is inserted inside the first tube 210 to occupy the first cavity 222 such that the second outer surface 234 and the first inner surface 216 are spaced by a gap 227. The gap 227 has a width sufficient to allow the analyte 240 to flow through the second cavity 224 as the second tube 220 is inserted into the first tube 210. In one embodiment, the width is between 50 microns to 200 microns. The second inner surface 232 is coated by a reflective material. The reflective material is similar to that used in the first embodiment above. In other words, it is made of metal such as silver, gold, aluminum, and copper.

The stopper 260 has a mirror 265 and is configured to be capped at the entry port 250 to enclose the second tube 220. As the second tube 220 is inserted into the first tube 210 which filled with the analyte 240, the analyte 240 fills the second cavity 224 and reaches the fill indicator on the first tube 210. In other words, the second cavity 224 is capped or in contact with the window 230 at the first end 212 and is capped or in contact with the mirror 265 at the second end 214.

The apparatus 200 may include an overflow cavity 270 disposed around the stopper 260 and is configured to receive bubbles entrapped in the analyte 240. The stopper 260 may be designed or configured such that when it is fully inserted into the entry port 250, some of the analyte 240 is pushed into the overflow cavity 270. This will drive out any remaining bubbles in the sealed portion. In this embodiment, the need for a gap having a sufficient width to allow for the analyte 240 to flow through the second cavity 224 may be unnecessary because of the order of the assembly of the apparatus 200. In other words, the width 227 may be made to be very small with clearing enough for the second tube 220 to be fully inserted into the first tube 210. In addition, the apparatus 200 may also include a locking cap 280 engaged at the second end 214 to secure the first and second tubes 210 and 220 filled with the analyte 240. The locking cap 280 may be any suitable cap that helps ensure a tight and stable assembly.

Figure 3:
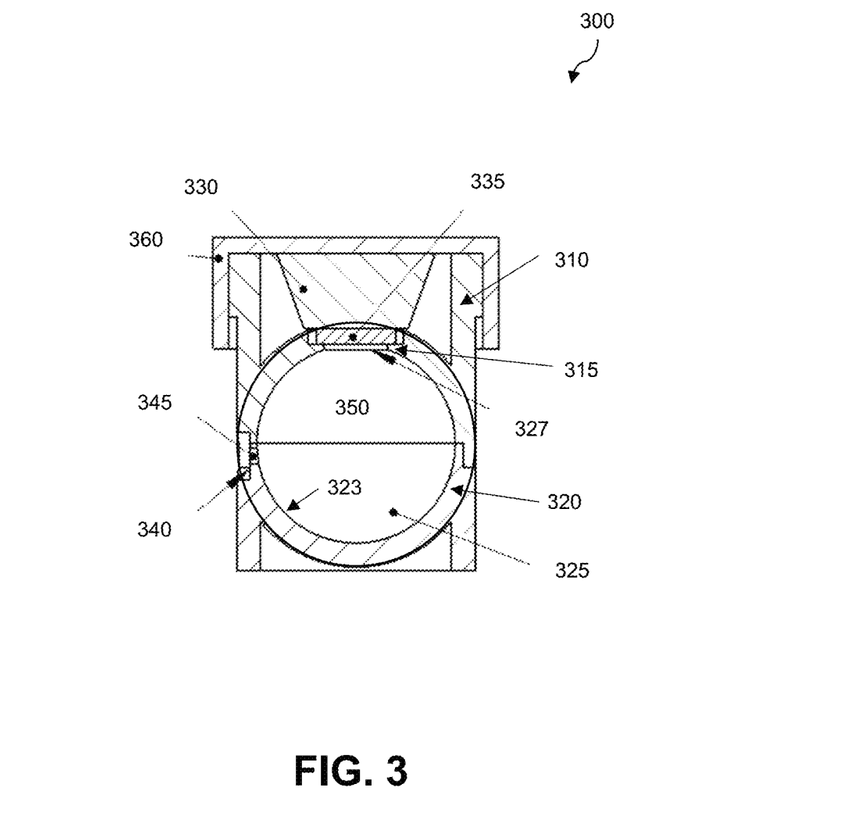
FIG. 3 is a diagram illustrating a cartridge with a chamber having a curved surface.

FIG. 3 is a diagram illustrating an apparatus 300 of a cartridge with a chamber having a curved surface. The apparatus 300 includes a housing 310, a chamber 320, and a stopper 330.

The housing 310 is configured to house or encapsulate the chamber 320. It has an entry port 315 to provide entry point for the analyte. The chamber 320 is shaped with a curved surface. The curved surface defines a shape of an object having a hollow solid geometry. The object may be one of a sphere, a regular ellipsoid, and an irregular ellipsoid, or any suitable three-dimensional shape. The chamber 320 has an inner surface 323, a cavity 325 with an opening 327, an observation port 345 sealed with a glass window 340. The chamber 320 is configured to hold an analyte 350. The inner surface 323 is coated by a reflective material. The reflective material is similar to that used in the first and second embodiments above. In other words, it is made of metal such as silver, gold, aluminum, and copper. The observation port 345 provides a location for observing or viewing the cavity 325. It is positioned at a location suitable for observation. The location may be at a side, bottom, or top of the chamber, or any suitable location. Typically, the side location provides the best view, but other locations may be useful for other specific needs. If the location is from the top, then the stopper 330 and the cap 360 may be of a ring design to allow light to pass through the center. In addition, when the top is used for the location for the observation port, the mirror 335 may be replaced to become the window 340.

The stopper 330 has a mirror 335 and is configured to be capped by a cap 360 to enclose the chamber 320 at the opening 327. When the stopper 330 is capped after the chamber 320 is filled with the analyte 350, the mirror 335 is in contact with the analyte 350 to seal the cavity 325. In one embodiment, the mirror 335 is disposed at an angle with respect to the stopper to reduce bubble formation on the mirror 335. The mirror 335 is configured such that, as the stopper 330 is pressed onto the opening 327, the mirror 335 lays flat to seal the cavity 325.

A typical use of the apparatus is as follows. The user removes the cap 360, fills the cavity 325 of the chamber 320 with the analyte 350 to the fill line, then puts the cap 360 back. The chamber 320 should be filled such that the opening 327 is fully submerged. Because the opening 327 is submerged when the cap 360 is tightened, no bubbles are present in the cavity 325. In addition, the opening 327 should be large enough to prevent any capillary action of the analyte 350 creating a bubble, and thus sealing air inside the cavity 325.

Figure 4:
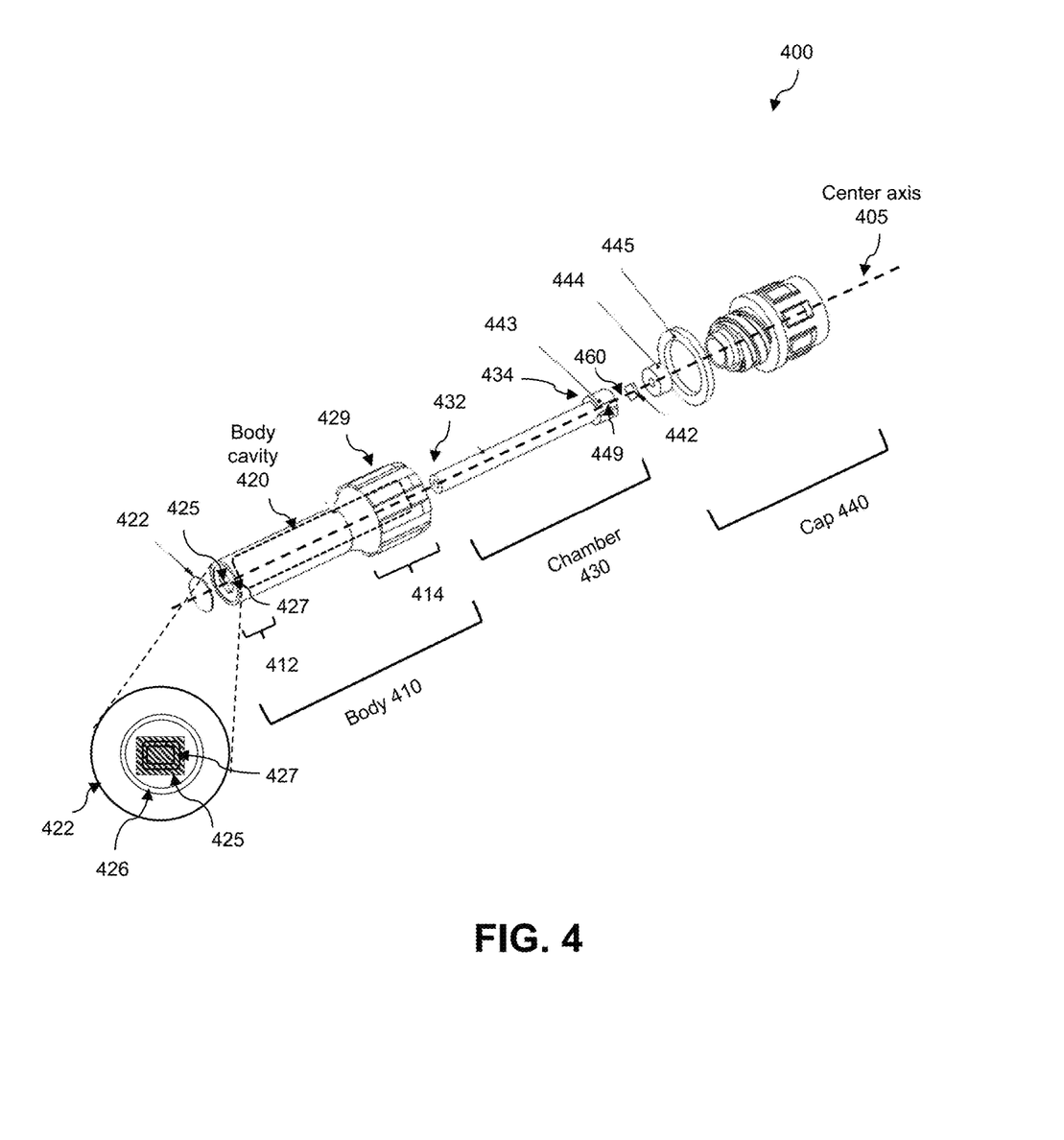
FIG. 4 is a diagram illustrating a carrier cartridge for reflective enhancement tubes.
Figure 5:
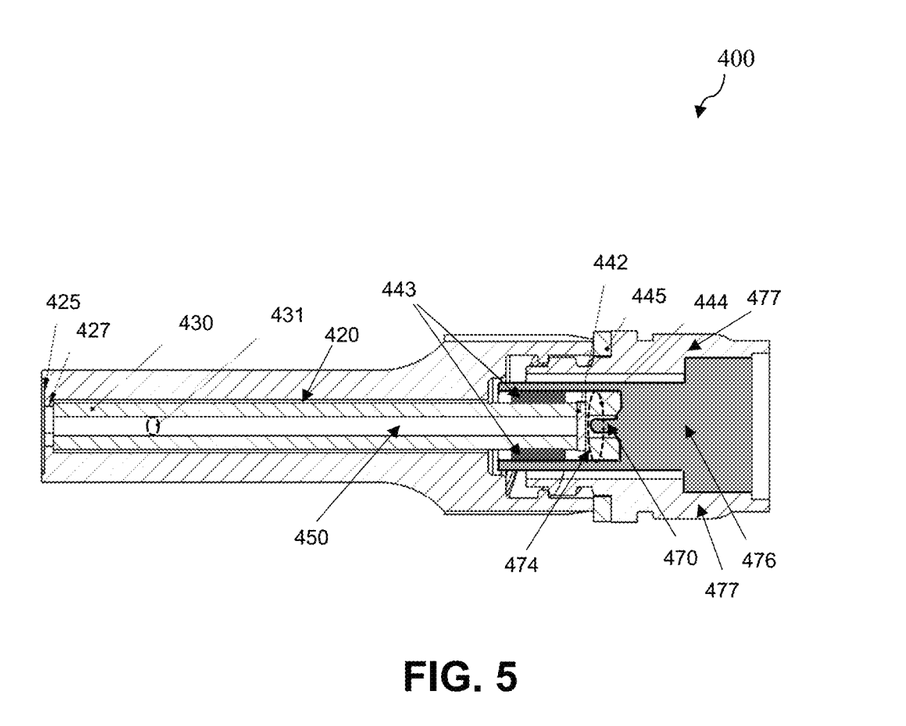
FIG. 5 is a diagram illustrating a cross section of a carrier cartridge for reflective enhancement tubes.

FIG. 4 is a diagram illustrating an apparatus 400 of a carrier cartridge for reflective enhancement tubes. FIG. 5 is a diagram illustrating a cross section of the apparatus 400 of a carrier cartridge for reflective enhancement tubes. The apparatus 400 includes a body 410 and a cap 440. The body 410 and the cap 440 form a carrier cartridge assembly to carry tubes with optically enhanced characteristics for Raman spectroscopy or other optical methods for molecular analysis of a liquid or an analyte. The apparatus 400 can accommodate different types of tubes by modifying the dimensions, sizes, shapes, and other mechanical aspects to fit a particular type of tube. The apparatus 400 has a center axis 405. The center axis 405 is a virtual line that is a central axis through all the components of the apparatus 400. Most components in the apparatus 400 are symmetrical about the center axis 405.

The body 410 has a first tubular shape elongated along the center axis 405 from a first body end 412 to a second body end 414. All are aligned with the center axis 405. The length of the body 410 is slightly longer than the length of the tube to be inserted into the body 410. The body 410 includes a body cavity 420, a glass window 422, an entry port 425, a shoulder 427, and a cap receptacle 429.

The body cavity 420 is shaped according to the first tubular shape of the body 410 to accommodate a chamber 430 with a second tubular shape. The chamber 430 is a tube and has a chamber cavity 431. The body cavity 420 is configured to be filled with an analyte 450. After it is filled with the analyte 450, the chamber 430 is inserted into the body cavity 420 and in the process the chamber cavity 431 is filled with the analyte 450. Thereafter, the chamber 430 holds the analyte 450 for analysis. The second tubular shape is configured such that it fits within the first tubular shape with sufficient space around it to allow the analyte 450 to flow as the chamber 430 is inserted into the body cavity 420. The entry port 425 is disposed at the first body end to receive optical signals. A small lip 426 may be used to surround the entry port 425 to insure easy alignment of the glass window 422. The glass window 422 is disposed at the entry port 425 and is positioned in alignment with the center axis 405. The glass window 422 provides low signal interference when the cartridge is in use. The shoulder 427 is disposed on the glass window 422 and is configured to retain a first chamber end 432 of the chamber 430. It may be a small circular ledge or multiple segments that protrude from the body 410 or inward from the body cavity 420 to provide strain relief and other mechanical support function when the chamber 430 is inserted into the body cavity 420. The shoulder 427 is configured to protect the glass window 422. In addition, the shoulder 427 is shaped to allow bubbles to escape from an area of the glass window 422 when the analyte 450 enters the body cavity 420. The shoulder 427 is configured to take into account the trade-offs between the added thickness for extra holding strength and a more optimal placement of the chamber 430. If the shoulder 427 is too small, it may not provide enough holding force to prevent the window 422 from breaking or coming loose as the body 410 is closed. If it is too thick, it may interfere with the optical path. In one embodiment, the shoulder 427 is shaped as a slot opening. The cap receptacle 429 is at the second body end 414. The cap receptacle 429 is configured to mate with the cap 440. The cap receptacle 429 may include a Luer lock compatible thread to ensure compatibility with existing sealing caps. In addition, the cap receptacle 429 may have a relief such that the cap 440 can close all the way without exerting too much force. Knurling may be provided around the cap receptacle 429 to provide a good grip when tightening the cap.

The cap 440 is configured to mate with the cap receptacle 429 to secure a second chamber end 434 of the chamber 430. The cap 440 includes a reflection mirror 442, a centering ring 443, and a sealing gasket 445. Additional components may be included and will be described later in the following. The reflection mirror 442 is mounted on a mirror carrier 444. The reflection mirror 442 and the mirror carrier 444 are positioned in alignment with the center axis. As mentioned above, the chamber 430 is inserted into the body cavity 420 so that the analyte 450 can fill the chamber cavity 431 and is optically analyzed. This analysis is performed by projecting an optical signal into the body 410 through the entry port 425. The optical signal penetrates the analyte 450 toward the reflection mirror 442. The reflection mirror 442 is configured to return the optical signal back toward the glass window 422. The centering ring 443 holds the second chamber end 434 to keep the chamber 430 in place. The centering ring 443 has a gap 449 to prevent an airtight seal when the chamber 430 is inserted into the cap 440. The sealing gasket 445 is configured to seal the cap 440 and the cap receptacle 429 when the cap 440 is tightened to seal the body 410. The reflection mirror 442 is spaced from an end surface of the chamber 430 at the second chamber end 434 by a gap 460 after the chamber 430 is fully inserted into the body cavity 420 and prior to tightening the cap 440. The width of the gap 460 is selected to provide adequate flow rate of the analyte through the chamber 430 and the reflection mirror 442. In one embodiment, this width is approximately 1 mm. The reflection mirror 442 is in contact with the end surface of the chamber 430 as the cap 440 is tightened to seal the body 410. The gap 460 has a width sufficient to provide proper flow for reducing bubble entrapment in the analyte 450.

In one embodiment, the cap 440 may further include a centering rod 470, a cavity 474, a septum 476, and an outer shell 477. The cavity 474 is formed within the septum 476. The centering rod 470 is aligned and concentric with the center axis 405. The centering rod 470 is configured to protrude from the inside surface of the cavity 474. In one embodiment, the centering rod 470, the cavity 474, and the septum 476 are integrated into a single element, usually made of soft silicone or a similar material. When the cap 440 is tightened to secure the body 410 and chamber 430 assembly, the centering rod 470 points toward the mirror 442 to prevent the mirror 442 and the mirror carrier 444 from moving around. The centering ring 443 is aligned with the centering rod 470 such that they are self-aligning. The centering ring 443 may hold the reflection mirror 442 in addition to the mirror carrier 444. The centering ring 443 secures the chamber 430 before the chamber 430 is inserted into the body cavity 420. The cavity 474 is configured to have an inner diameter sufficiently small to secure the second chamber end 434 of the chamber 430. The outer shell 477 is configured to surround the septum 476 to keep the assembly of the centering ring 443, the mirror 442, the mirror carrier 444, the septum 476, the cavity 474, and the centering rod 470 in place. The outer shell 477 may be made of plastic or a similar material strong enough to provide overall mechanical support and stability for the entire assembly of the above components. In one embodiment, the septum 476 is configured to have at least one flow channel to allow the analyte 450 unrestricted flow out of the chamber 430 as the body 410 is being sealed.

Variations of the above configurations may be carried out. For example, additional components may be provided or the components may be modified to accommodate different configurations of the cartridge, the tube, or the chamber. It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus comprising:
a body having a first tubular shape, a first body end, and a second body end aligned with a center axis, the body comprising:
a body cavity shaped according to the first tubular shape to accommodate a chamber, the chamber having a second tubular shape, a first chamber end and a second chamber end;
an entry port at the first body end;
a glass window at the entry port positioned in alignment with the center axis;
a shoulder disposed on the glass window and configured to retain the first chamber end; and
a cap receptacle at the second body end,
wherein the body cavity is configured to hold an analyte; and
a cap configured to mate with the cap receptacle to secure the second chamber end, the cap comprising:
a reflection mirror mounted on a mirror carrier positioned through the center axis and configured to return an optical signal back toward the glass window;
a centering ring configured to hold the second chamber end to keep the chamber in place; and
a sealing gasket configured to seal the cap and the cap receptacle when the cap is tightened to seal the body;
wherein the chamber is configured to be inserted into the body cavity filled with the analyte,
wherein the reflection mirror is spaced from a surface of the chamber at the second chamber end by a gap after the chamber is fully inserted into the body cavity and prior to tightening the cap, and
wherein the reflection mirror is in contact with the surface as the cap is tightened to seal the body.

2. The apparatus of claim 1 wherein the shoulder is configured to protect the glass window.

3. The apparatus of claim 1 wherein the shoulder is shaped to allow bubbles to escape from an area of the glass window.

4. The apparatus of claim 3 wherein the shoulder is shaped as a slot opening.

5. The apparatus of claim 1 wherein the gap has a width sufficient to provide proper flow for reducing bubble entrapment in the analyte.

6. The apparatus of claim 1 wherein the cap further comprises:
a centering rod aligned and concentric with the center axis,
wherein the centering ring is aligned with the centering rod and holds the reflection mirror,
wherein the centering ring secures the chamber before the chamber is inserted into the body cavity.

7. The apparatus of claim 1 wherein the cap further comprises:
a septum, and
a cavity formed within the septum and surrounding the centering rod.

8. The apparatus of claim 7 wherein the cavity is configured to have an inner diameter sufficiently small to secure the second chamber end of the chamber.

9. The apparatus of claim 7 wherein the septum is configured to have at least one flow channel to allow the analyte unrestricted flow out of the chamber as the body is being sealed.

10. A method comprising:
shaping a body cavity according to a first tubular shape in a body to accommodate a chamber, the body having a first body end and a second body end aligned with a center axis, the chamber having a second tubular shape, a first chamber end and a second chamber end;
positioning a glass window at an entry port at the first body end in alignment with the center axis;
retaining the first chamber end by disposing a shoulder on the glass window;
holding an analyte in the body cavity; and
mating a cap with a cap receptacle at the second body end to secure the second chamber end, wherein mating comprises:
mounting a reflection mirror on a mirror carrier positioned through the center axis to return an optical signal back toward the glass window,
holding the second chamber end with a centering ring to keep the chamber in place, and
sealing the cap and the cap receptacle with a sealing gasket when the cap is tightened to seal the body;
inserting the chamber into the body cavity filled with the analyte,
spacing the reflection mirror from a surface of the chamber at the second chamber end by a gap after the chamber is fully inserted into the body cavity and prior to tightening the cap, and
tightening the cap to seal the body so that the reflection mirror is in contact with the surface.

11. The method of claim 10 wherein retaining the first chamber end protects the glass window.

12. The method of claim 10 wherein retaining the first chamber end comprises shaping the shoulder to allow bubbles to escape from an area of the glass window.

13. The method of claim 12 wherein shaping the shoulder comprises shaping the shoulder as a slot opening.

14. The method of claim 10 wherein spacing the reflection mirror from a surface comprises providing proper flow for reducing bubble entrapment in the analyte by the gap having a sufficient width.

15. The method of claim 10 wherein spacing the reflection mirror from a surface comprises:
aligning a centering rod concentric with the center axis,
aligning the centering ring with the centering rod and holding the reflection mirror,
securing the chamber before inserting the chamber into the body cavity by the centering ring.

16. The method of claim 10 wherein spacing the reflection mirror from a surface comprises:
forming a cavity within a septum to surround the centering rod.

17. The method of claim 16 wherein forming the cavity comprises forming the cavity to have an inner diameter sufficiently small to secure the second chamber end of the chamber.

18. The method of claim 16 wherein forming the cavity comprises allowing the analyte unrestricted flow out of the chamber as the body is being sealed by at least one flow channel in the septum.

\* \* \* \* \*